US012228276B2

(12) United States Patent
Rapeanu

(10) Patent No.: US 12,228,276 B2
(45) Date of Patent: Feb. 18, 2025

(54) EMERGENCY LIGHTING HEAD WITH HORIZONTAL ROTATION AND ASSOCIATED OPTICS

(71) Applicant: ABB Schweiz AG, Baden (CH)

(72) Inventor: Radu Cornel Rapeanu, Quebec (CA)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 18/521,880

(22) Filed: Nov. 28, 2023

(65) Prior Publication Data

US 2024/0175566 A1 May 30, 2024

Related U.S. Application Data

(60) Provisional application No. 63/385,161, filed on Nov. 28, 2022.

(51) Int. Cl.
*F21V 5/08* (2006.01)
*F21Y 115/10* (2016.01)

(52) U.S. Cl.
CPC ............. *F21V 5/08* (2013.01); *F21Y 2115/10* (2016.08)

(58) Field of Classification Search
CPC . F21V 5/08; F21V 14/00; F21V 14/02; F21V 14/025; F21V 14/06; F21V 14/065; F21V 21/14; F21V 21/145; F21V 21/30; F21Y 2115/10
See application file for complete search history.

(56) References Cited

U.S. PATENT DOCUMENTS

| | | | | |
|---|---|---|---|---|
| 7,390,110 B2 * | 6/2008 | Katz | F21V 21/30 362/418 |
| 9,080,747 B1 * | 7/2015 | Hetrick | F21V 15/01 |
| 2008/0143259 A1 * | 6/2008 | Sibout | F21V 29/89 315/78 |
| 2015/0369430 A1 * | 12/2015 | Vamberi | F21K 9/65 362/235 |
| 2016/0305637 A1 * | 10/2016 | Brunelli | F21V 21/30 |

* cited by examiner

*Primary Examiner* — Bao Q Truong
(74) *Attorney, Agent, or Firm* — Greenberg Traurig, LLP

(57) ABSTRACT

An emergency lighting device may include a housing container, wherein the housing container includes: a body defining a cavity, and a structural assembly, wherein the structural assembly is configured to be adjustably rotatable along a first translatable axis and independently rotatable along a second translatable axis extending transversely to the first translatable axis. An emergency lighting device may include a lighting assembly, wherein the lighting assembly includes at least one light source, wherein the at least one light source is mounted to the structural assembly, and the at least one light source is configured to illuminate an asymmetrical beam of light. An emergency lighting device may include an electrical circuit, wherein the electrical circuit is disposed in the cavity of the housing container. An emergency lighting device may include the electrical circuit is configured to electrically power to illuminate the at least one light source.

19 Claims, 9 Drawing Sheets

EMERGENCY LIGHTING HEAD WITH HORIZONTAL ROTATION AND ASSOCIATED OPTICS

CROSS-REFERENCE TO RELATED APPLICATIONS

The present application claims priority to U.S. provisional application No. 63/385,161, filed on Nov. 28, 2022, and contains subject matter related to that disclosed in PCT International Patent application no. PCT/US23/81376, filed on Nov. 28, 2023, the entire contents of each of which are incorporated herein by reference.

FIELD

This disclosure relates generally to emergency lighting devices. More particularly, this disclosure relates to systems providing optimal illumination levels on the path of egress without adjusting the vertical aiming on an emergency lighting device or the like.

BACKGROUND

An emergency lighting head, or commonly named an emergency light, is a light fixture that illuminates key safety areas when a building experiences power loss. Emergency lights are standard in new commercial and high-occupancy residential buildings, and some countries require that emergency lights be installed in older buildings.

SUMMARY

In some embodiments, an emergency lighting device includes a housing container. In some embodiments, the housing container includes a body defining a cavity, and a structural assembly. In some embodiments, the structural assembly is configured to be adjustably rotatable along a first translatable axis and independently rotatable along a second translatable axis extending transversely to the first translatable axis. In some embodiments, a lighting assembly includes at least one light source. In some embodiments, the at least one light source is mounted to the lighting assembly mounted to the structural assembly. In some embodiments, the at least one light source is configured to illuminate an asymmetrical beam of light. In some embodiments, an electrical circuit is disposed in the cavity of the housing container. In some embodiments, the electrical circuit is configured to electrically power to illuminate the at least one light source.

In some embodiments, the emergency lighting device includes at least one aspherical lens being disposed over the at least one light source.

In some embodiments, the at least one aspherical lens produces an asymmetrical light beam output.

In some embodiments, an orientation of the asymmetrical light beam output adjusts while a shape of the asymmetric lens beam remains substantially constant when the at least one aspherical lens is rotated.

In some embodiments, the emergency lighting device includes at least one aspherical lens being disposed over the at least one light source.

In some embodiments, the at least one aspherical lens has a shape configured to allow for an elongated illumination on a floor at a predetermined distance.

In some embodiments, the device is configured to have no vertical orientation to tilt.

In some embodiments, the device is configured to adjust the asymmetrical beam of light by a horizontal orientation to rotate.

In some embodiments, the lighting assembly mounted in the structural assembly is rotated about on a vertical axis.

In some embodiments, the at least one light source is a light-emitting diode (LED).

In some embodiments, the emergency lighting device includes a housing container. In some embodiments, the housing container includes a body defining a cavity, and a structural assembly. In some embodiments, the structural assembly is configured to be adjustably rotatable along a first translatable axis and independently rotatable along a second translatable axis extending transversely to the first translatable axis. In some embodiments, the structural assembly is configured to be not tilted. In some embodiments, a lighting assembly includes a plurality of light sources. In some embodiments, the plurality of light sources are mounted to the lighting assembly mounted to the structural assembly. In some embodiments, the plurality of light sources are configured to illuminate an asymmetrical beam of light. In some embodiments, an electrical circuit is disposed in the cavity of the housing container. In some embodiments, the electrical circuit is configured to electrically power to illuminate the plurality of light sources.

In some embodiments, the device has at least one pre-defined position for a beam orientation.

In some embodiments, the at least one pre-defined position for the beam orientation includes 90 degrees, 180 degrees, 270 degrees, and 360 degrees.

In some embodiments, the plurality of light sources has at least one independent lens.

In some embodiments, the plurality of light sources has a plurality of lenses molded into the lighting assembly.

In some embodiments, the plurality of lenses are of various beam patterns.

In some embodiments, the lighting assembly is mounted in the structural assembly at a non-horizontal plane at a predetermined angle.

In some embodiments, the emergency lighting device includes a power source, the power source including a battery.

In some embodiments, the emergency lighting device has a fixed orientation.

In some embodiments, the lighting assembly is recessed into the housing container.

BRIEF DESCRIPTION OF DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION OF DRAWINGS

Figure 1:
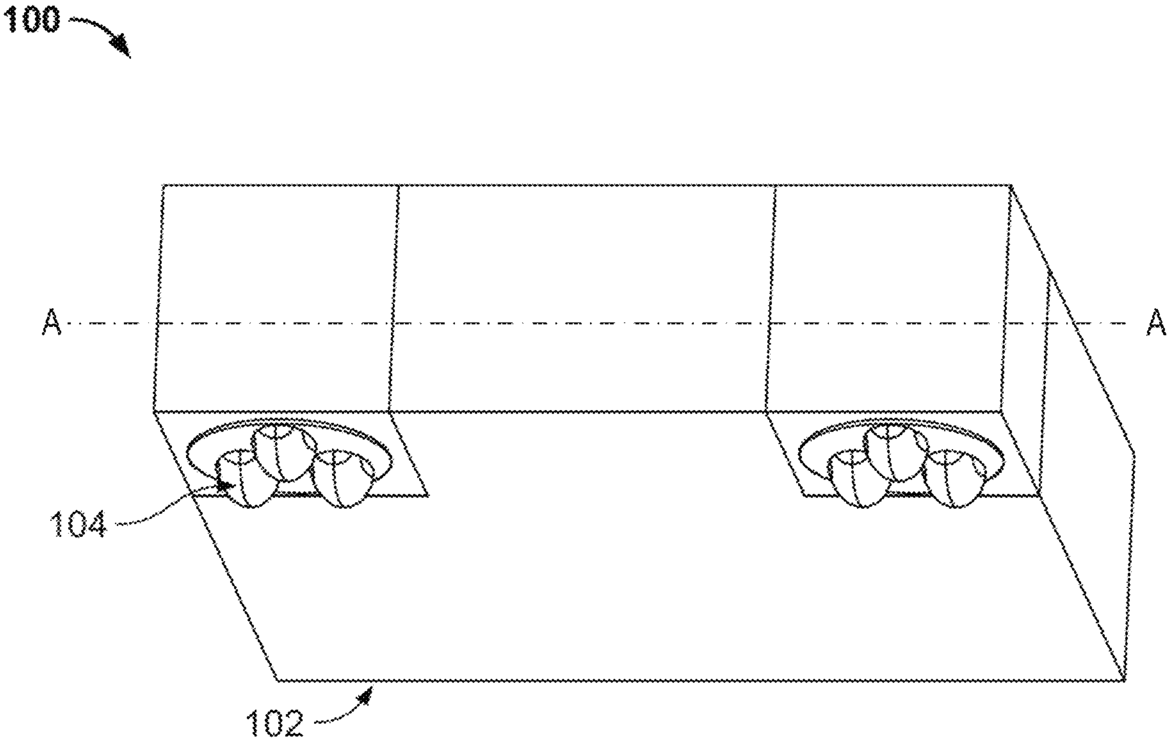
FIG. 1 shows an example emergency lighting device configured to be installed on a horizontal surface, according to some embodiments.

This disclosure relates to providing optimal illumination levels on the path of egress without adjusting the vertical aiming of an emergency lighting device.

Traditionally, emergency lights have symmetrical lights, such as a flashlight. During installation, the emergency lights may be aimed along the path of egress. For example, the emergency lights rotate towards a corridor and tilt to send the light beam far along. Rotation for alignment along the corridor is easy to visualize, but the tilt angle may directly affect the illuminance levels on the corridor floor. A higher tilt may reduce the illuminance below the requirements of a given safety code. A lower tilt angle increases the illuminance but reduces the distance of light coverage on the floor.

Verifying compliance with an emergency light can be time-consuming. For example, a power failure must be simulated in total obscurity at nighttime. In another example, the light levels (in lux or foot-candle units) must be measured on the floor with a light meter, then calculated for the average, minimum and maximum levels, and compared with the relevant code requirements. Further, conventional emergency lights generally have a large and protruding appearance that can be distracting and throw off an aesthetic of a room.

Embodiments of this disclosure include an emergency lighting head that does not require a tilt adjustment. The emergency lighting head can then guarantee adequate lighting performance to illuminate a floor to meet relevant safety codes. In some embodiments, the emergency lighting head is recessed into a device where only the light sources and optics are exposed at the bottom. In some embodiments, the optics may be lenses. The recessed emergency lighting head makes the device aesthetically neutral, discrete, and easier to blend into building décor.

In some embodiments, an emergency lighting head having a light source with optics is utilized with an asymmetrical light beam. While the light source is horizontal and aimed downwards, the light beam having a maximum light intensity, is at a vertical angle about the nadir. The light beam is sent at the desired path by rotating the head in the horizontal plane. Because the emergency lighting head does not tilt, it keeps the illuminance levels on the floor stable regardless of the direction of the light beam along the path of egress. The emergency lighting head can meet the rated lighting performance without the risk of an improper tilt adjustment.

In some embodiments, the lighting assembly is a cylinder and may be rotated horizontally about the vertical axis. In some embodiments, the lighting assembly comprises a light source, a heat dissipator, and optics. In some embodiments, the light sources include one or several light-emitting diodes (LEDs) installed on a printed circuit board. In some embodiments, the heat dissipator may be a heat sink. In some embodiments, the optics are lenses. The components are mounted in horizontal planes and rotated with the cylinder.

In some embodiments, the lenses create an asymmetrical light beam in one direction, such as a forward throw, with a narrow beam spread. The forward throw is an optic that creates a round distribution pattern that directly pushes light outward. This light distribution is best used in parking area perimeters and wall mounting on building exteriors.

The details of the optical design (e.g., the vertical angle of the center beam, etc.) depend on parameters like a manufacturer's recommended mounting height at installation, the luminous flux (i.e., lumen units) of the light source, and the length of the path of egress (e.g., spacing) intended to illuminate.

The emergency lighting head is positioned at the bottom of the device and recessed in the device housing, except for the light source(s) and the optical components. In some embodiments, a typical emergency lighting device can be equipped with one, two, or several emergency lighting heads, with each head rotating independently. In some embodiments, the emergency lighting heads can rotate up to almost 360 degrees in the horizontal plane.

In some embodiments, when the device is supplied with electrical power, the emergency lighting turns on at installation. The installer (i.e., the person installing the device) may rotate each head with the light beam along the desired path of egress. For example, two emergency lighting heads may be aimed left and right along a corridor. For example, two emergency lighting heads may be aimed at a right angle if installed at a hallway corner. In some embodiments, a device with three heads may be installed at the junction of three hallways, and so on.

In some embodiments, the emergency lighting head may have selectable, predefined positions for beam orientation. For example, at every 90 degrees, there may be a selectable, predefined position for beam orientation. The emergency lighting heads may contain several light sources and independent optics in some embodiments. In some embodiments, the emergency lighting head may have several light sources with individual optics of different beam patterns. In some embodiments, the emergency lighting head may have several individual optics molded into a one-piece lens module. In some embodiments, the emergency lighting head may have one or more light sources with optics mounted in a non-horizontal plane at a certain angle.

FIG. 1 shows an example embodiment of an emergency lighting device 100 installed on a horizontal surface with a plurality of light sources, according to some embodiments. The components and arrangements shown in FIG. 1 are not intended to limit the disclosed embodiments, as the components used to implement the disclosed features may vary. In accordance with disclosed embodiments, the emergency lighting device 100 may include a housing container 102, a lighting assembly 104, and an electrical circuit (not shown).

In some embodiments, the housing container 102 includes a structural assembly. In some embodiments, the structural assembly may be configured to be adjustably rotatable along a first translatable axis and independently rotatable along a second translatable axis that extends transversely to the first translatable axis. In some embodiments, the structural assembly may be installed in line with or perpendicular to the housing container 102. Such a configuration provides the same lighting performance when the housing container 102 is mounted on a wall (i.e., a vertical surface, FIG. 2) or a ceiling (i.e., a horizontal surface, FIG. 1).

In some embodiments, the structural assembly is configured to have no vertical tilt. In some embodiments, the structural assembly is configured to adjust the asymmetrical beam of light by a horizontal orientation to rotate. In some embodiments, the structural assembly is rotated about by a vertical axis. In some embodiments, the structural assembly has a fixed orientation.

In some embodiments, the housing container 102 includes a body defining a cavity. In some embodiments, the cavity may hold the structural assembly, the lighting assembly 104, and the electrical circuit. In some embodiments, the housing container 102 may be a variety of shapes and sizes and is not limited to the example housing container 102 shown in FIG. 1. For example, the housing container 102 may be in the form of a rectangle, a square, a circle, an octagon, etc.

In some embodiments, the lighting assembly 104 includes at least one light source. In some embodiments, the at least one light source is mounted to the lighting assembly that is mounted to the structural assembly. In some embodiments, the at least one light source is configured to illuminate an asymmetrical beam of light. In some embodiments, the lighting assembly 104 has at least one aspherical lens being disposed over the at least one light source. In some embodiments, the at least one aspherical lens produces the asymmetrical light beam output. In some embodiments, the asymmetrical beam of light has an orientation output that adjusts while the shape of the asymmetric lens beam remains substantially constant when the at least one aspherical lens is being rotated. In some embodiments, the lighting assembly 104 is recessed into the housing container 102.

In some embodiments, the at least one light source is an LED (Light-Emitting Diode). In some embodiments, at least one aspherical lens is disposed over the at least one light source. In some embodiments, the at least one aspherical lens has a shape configured to allow for an elongated illumination on a floor at a predetermined distance. In some embodiments, the lighting assembly 104 includes a plurality of light sources. In some embodiments, the lighting assembly 104 has at one pre-defined position for a beam orientation. In some embodiments, the at least one pre-defined position for the beam orientation includes 90 degrees, 180 degrees, 270 degrees, and 360 degrees.

In some embodiments, the plurality of light sources has at least one independent lens. In some embodiments, the plurality of light sources has a plurality of lenses molded into the lighting assembly 104. In some embodiments, the plurality of lenses are of various beam patterns. For example, the various beam patterns may include spot (e.g., long-range), driving and spread, fog, and flood.

In some embodiments, the electrical circuit is disposed of in the cavity of the housing container 102. The electrical circuit is powered by the building's electricity source in some embodiments. In some embodiments, the electrical circuit is powered by a second power source, such as a battery. For example, if the building's power goes out, the battery is active, and the emergency lighting device remains powered on. In some embodiments, the electrical circuit is configured to power to illuminate the at least one light source electrically.

Figure 2:
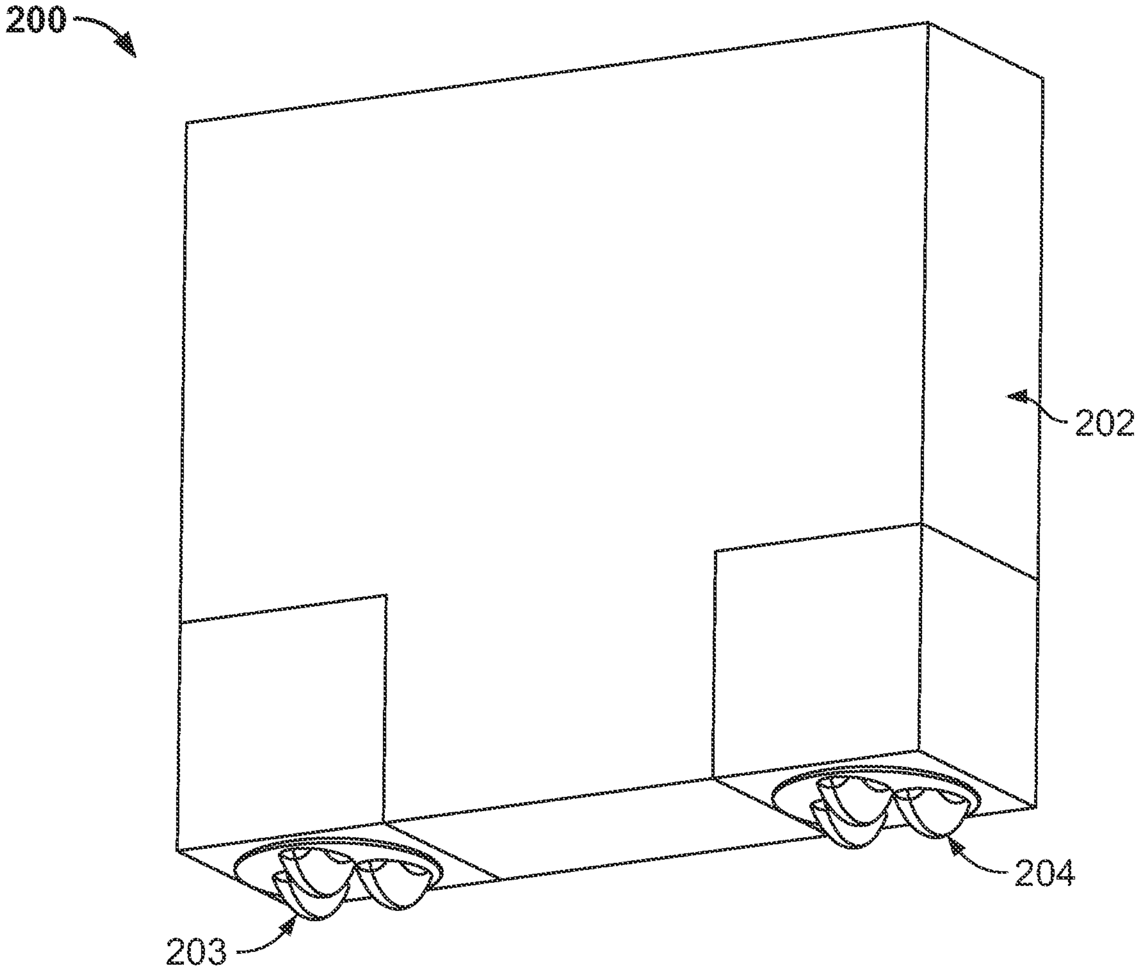
FIG. 2 shows an example emergency lighting device configured to be installed on a vertical surface with a plurality of light sources, according to some embodiments.

FIG. 2 shows another embodiment of an example emergency lighting device 200 installed on a vertical surface with a plurality of light sources, according to some embodiments. As described in FIG. 1, the example emergency lighting device 200 contains all the same components, including a housing container 202, two lighting assemblies 203, 204, and the electrical circuit (not shown). The emergency lighting device 200 can be configured in numerous shapes and sizes and is not limited to the box shape presented in FIG. 2. In some embodiments, each of the lighting assemblies 203, 204 includes one or more light sources, a heat dissipator, and optic(s), as further defined in FIGS. 3 and 4.

In some embodiments, the emergency lighting device 200 may comply with various regulations, laws, rules, and ordinances that regulate emergency lighting devices. In some embodiments, the emergency lighting device 200 may comply with the United States Standard of the Underwriters Laboratory UL-924. In some embodiments, the emergency lighting device 200 may comply with the Canadian Electrical Code CSA22.2. In some embodiments, the emergency lighting device 200 complies with standards covering emergency lighting equipment, exit signs, and the like.

In some embodiments, the emergency lighting device 200 may meet the American and Canadian Codes regulating performance for emergency lighting, including the National Electrical Code NFPA 70, the Life Safety Code NFPA 101, and the National Building Code of Canada.

Figure 3:
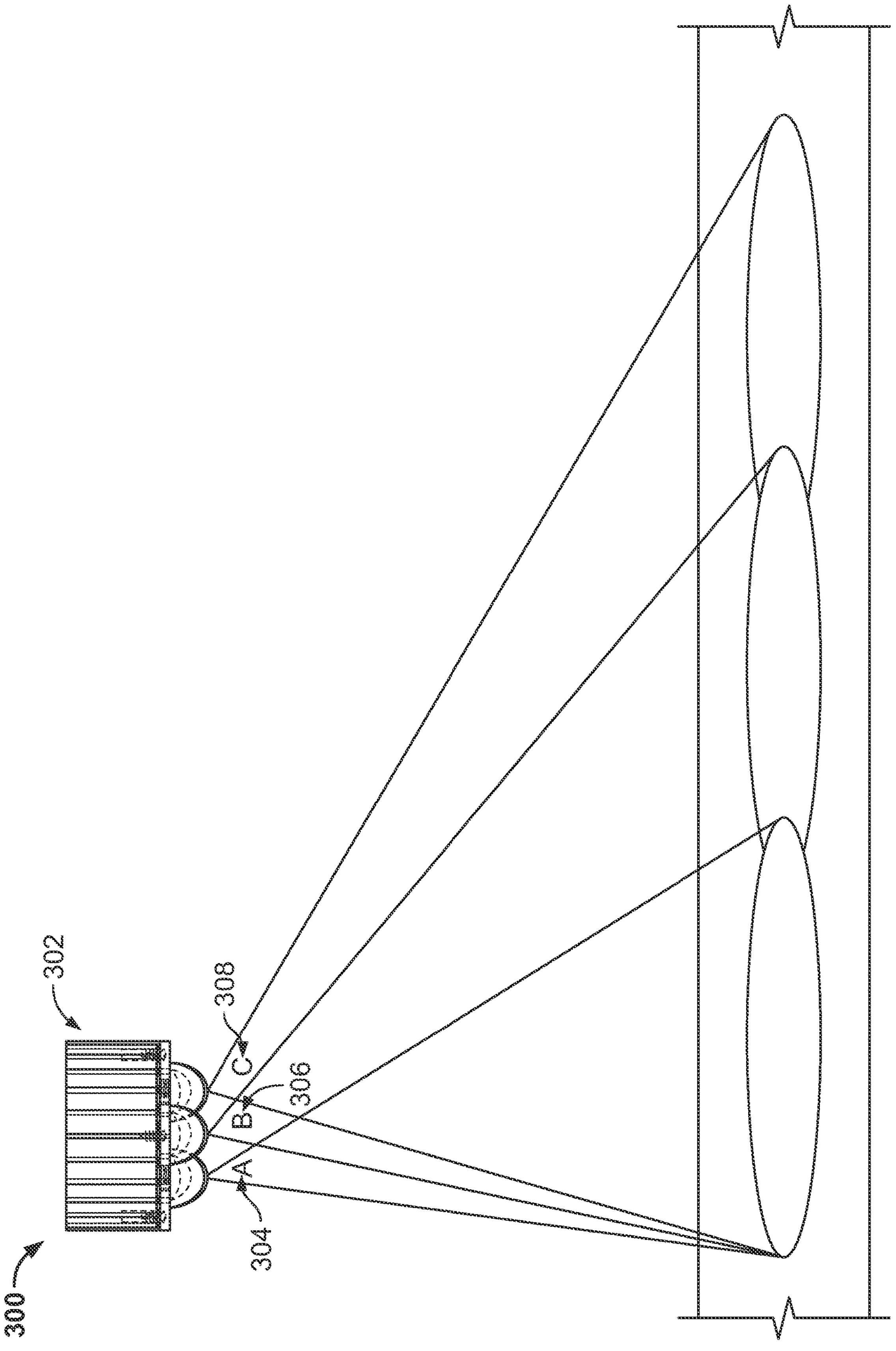
FIG. 3 shows an example environment for and an example lighting assembly with lenses for lighting coverages of various distances implemented by the emergency lighting device of FIG. 1, according to some embodiments.

FIG. 3 shows an example environment 300 for a lighting assembly with lenses for lighting coverages of various distances implemented by the emergency lighting device of FIG. 1, according to some embodiments. FIG. 3 illustrates an example lighting assembly (e.g., an exemplary emergency lighting device 302 with lens A 304, lens B 306, and lens C 308).

In some embodiments, the lighting assembly has two or more LEDs with individual lenses. In some embodiments, the design of each lens may differ from one another. In some embodiments, the light beam of each lens may be aimed at a specific vertical angle and cover a certain zone on the path of egress. In some embodiments, the light beam has a maximum candela intensity.

The example environment 300 presents an emergency lighting device 302 with three LEDs and individual lenses. Although the light beams are all oriented in the same direction (i.e., the same vertical plane), the beams of each lens 304, 306, and 308, have a different aiming angle. For example, lens A 304 covers the floor in a short distance, and Lens B 306 and Lens C 308 each cover further distances along the path of egress.

The lighting assembly allows for the same hardware construction of emergency lighting heads to tailor its power consumption and the distance of lighting coverage to various market needs. In some embodiments, the optical design of the lenses 304, 306, and 308 allows the same emergency lighting head to provide the required illumination levels for a relatively large range of installation heights. For example, the installation height range may include 7.5 feet to 10 feet. In another example, the installation height range may include 7.5 feet to 12 feet.

In another example, suppose that one LED consumes 2 watts (W) of electrical power, and its lens creates a code-compliant lighting coverage of 16 feet along a corridor. In a standard assembly line, a manufacturer may install only one LED in the emergency lighting device 302 and offer a 2 W economical product with lighting coverage of 16 feet. The manufacturer may equip the same emergency lighting device 302 with two LEDs and provide a 4 W product with 32 feet of lighting coverage. Finally, the same emergency lighting device 302 with three LEDs may consume 6 W and illuminate by the relevant safety code in a 48-foot-long corridor. In some embodiments, the lighting assembly contains two or more LEDs covered by a single, larger lens.

Figure 4:
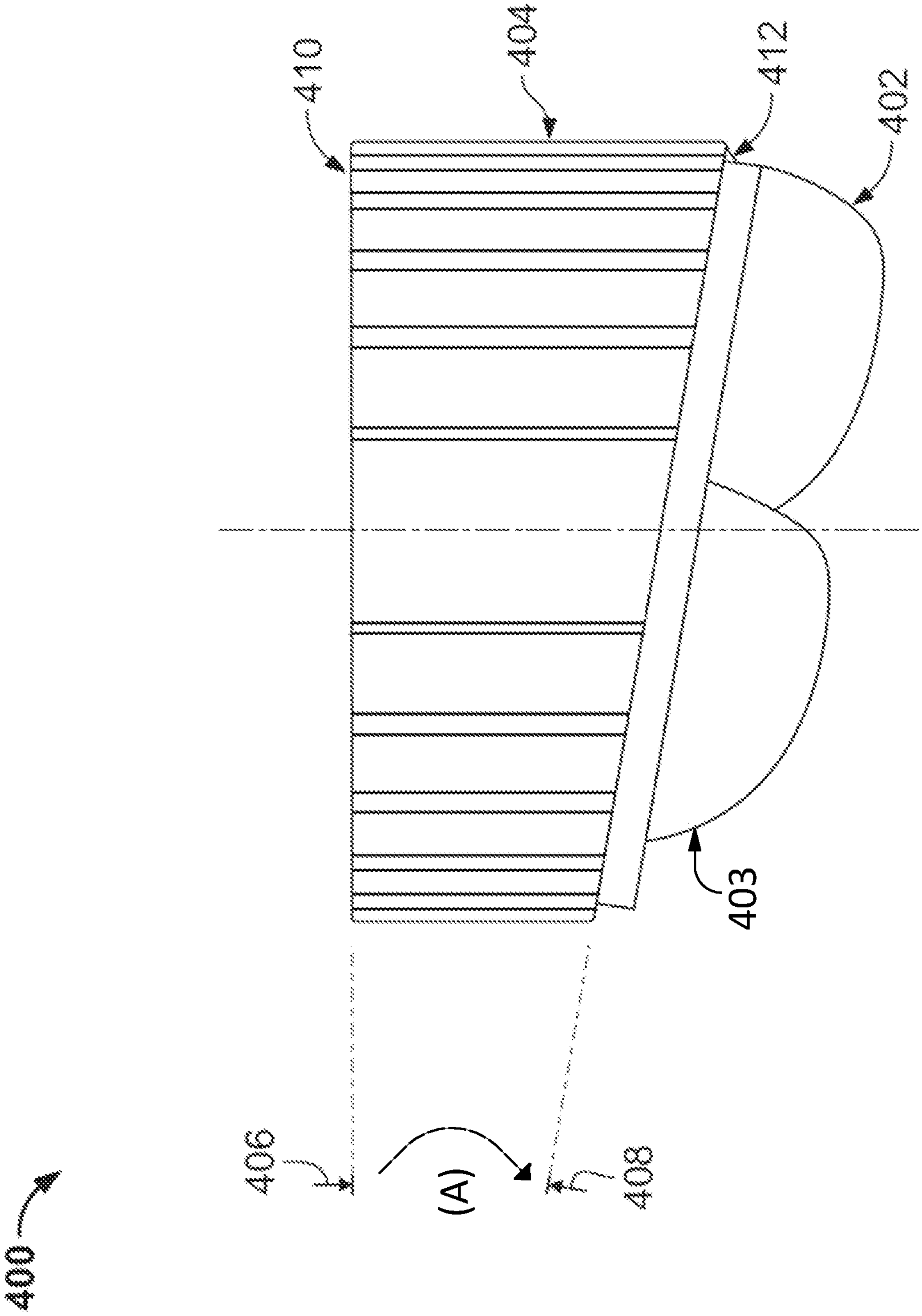
FIG. 4 shows an example lighting assembly where light sources and lenses are mounted at a non-horizontal angle, according to some embodiments.

FIG. 4 shows an example construction of a lighting assembly 400 for an emergency lighting device, where light sources and lenses are mounted at a non-horizontal angle, according to some embodiments. The lighting assembly 400 includes at least one lens, according to some embodiments. In other embodiments, the lighting assembly 400 includes at least two lenses. According to some embodiments of the lighting assembly 400, there are two lenses.

In some embodiments, the lighting assembly 400 has light sources housed in respective lenses 402, 403, where the lenses 402, 403 are connected to or mounted on a heat dissipator 404. The lenses 402, 403 are positioned at a fixed angle (A). According to some embodiments, the fixed angle (A) can be defined by an angle between a horizontal plane 406 and another plane 408, where the horizontal plane 406 is defined substantially by a top major surface 410 of the heat dissipator 404, and wherein the another plane 408 is defined substantially by a lower surface 412 of the heat dissipator 404 where the lenses 402, 403 are positioned.

In some embodiments, the lighting assembly 400 is a substantially cylindrical in shape configured to be rotatable about its vertical axis. In some embodiments, the fixed angle (A) may have a value in the range of 1 degree to 89 degrees.

Figure 5:
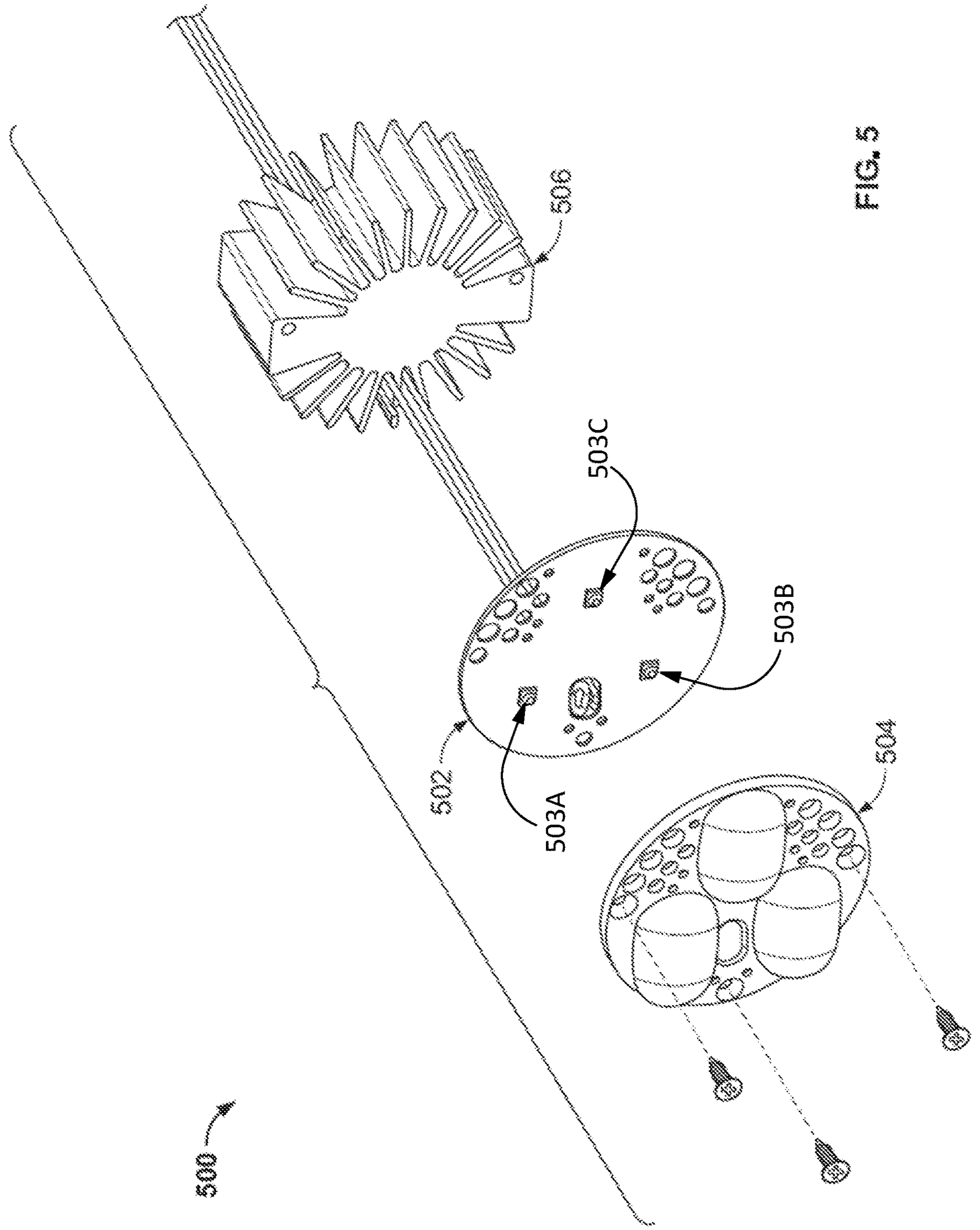
FIG. 5 shows an exploded view of an example lighting assembly, according to some embodiments.

FIG. 5 shows an example of an exploded view of the emergency lighting device 500 of FIG. 1, according to some embodiments. FIG. 5 includes an example emergency lighting device 500 with light sources 503A, 503B, 503C installed on a printed circuit board 502, optics 504, and a heat dissipator 506. In some embodiments, and as depicted in FIG. 5, the emergency lighting head is a cylinder and may be rotated horizontally about the vertical axis. In some embodiments, the light sources include one or several light-emitting diodes (LEDs) 503A, 503B, 503C installed on a printed circuit board 502. In some embodiments, the heat dissipator 506 may be called a heat sink. In some embodiments, the optics 504 are lenses. The components are mounted in horizontal planes and rotated with the cylinder.

As described in FIG. 1, the emergency lighting device 500 provides optimal illumination levels on the path of egress without needing to adjust the vertical aiming (e.g., the tilt). Conventional emergency lighting devices require adjusting the light beam horizontally (e.g., the rotation) and vertically (e.g., the tilt). Because adjustment is manual, inappropriate tilt adjustment at product installation may occur and ultimately reduce the illuminance levels on the floor below the requirements of relevant safety codes and standards.

The lighting assembly does not require tilt orientation. The lighting assembly is cylindrical and needs to be rotated only about the vertical axis. Such is possible by optics 504 with an asymmetrical light beam, unlike traditional emergency lights that use symmetrical beams to be aimed both by rotation and tilt. The lighting assembly enables the light beam to be aimed easier and faster and guarantees code compliance of illuminance levels for a given range of mounting heights.

Figure 6:
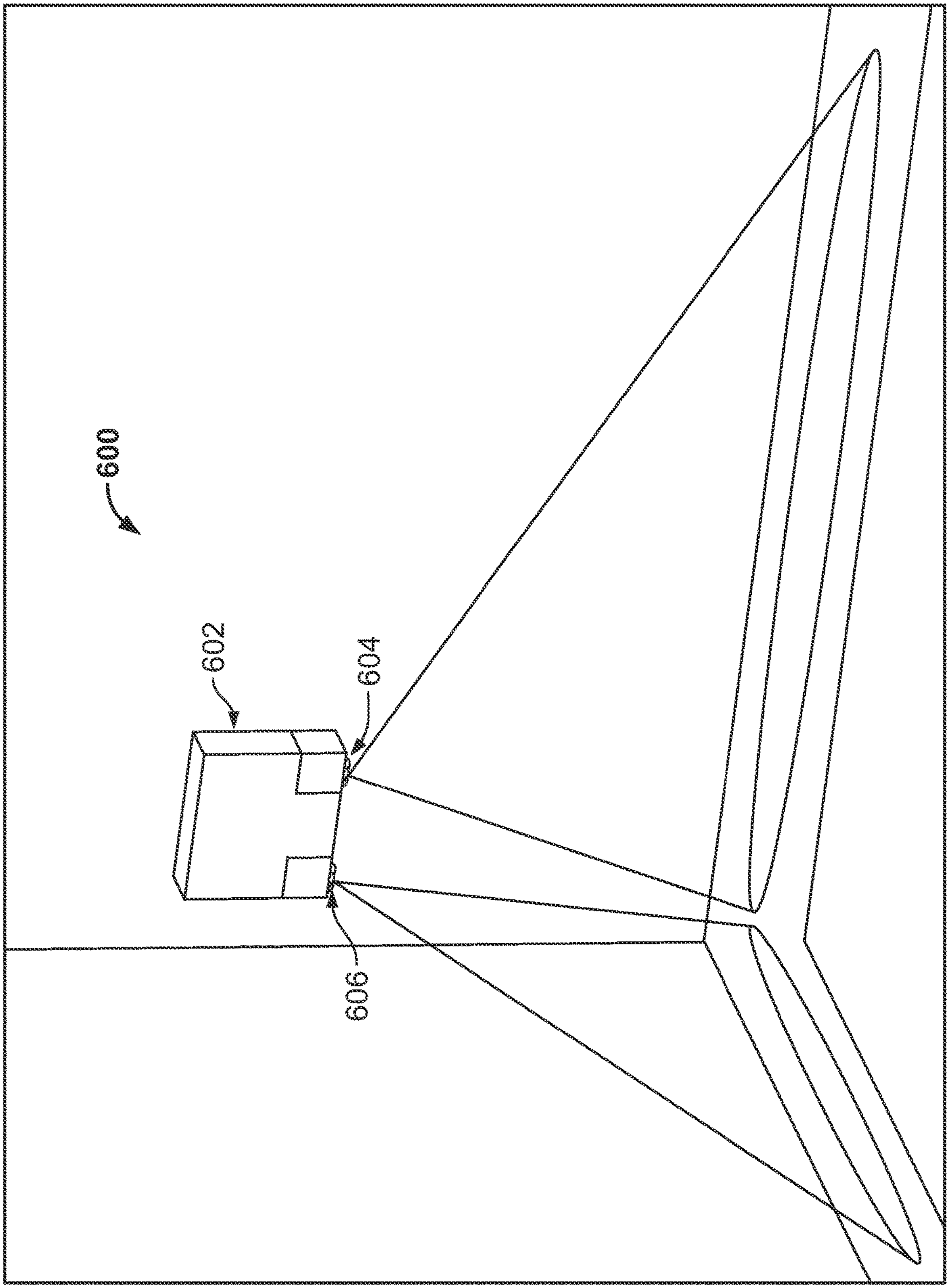
FIG. 6 shows an example environment for and an example emergency lighting device, showing exemplary lighting in an "L" shaped corridor of various distances which can be achieved via rotation of each of the example lighting assemblies, according to some embodiments.

FIG. 6 shows an example environment 600 with the rotation of the emergency heads for lighting coverages in an "L" shaped corridor of various distances implemented by the emergency lighting device of FIG. 2 according to some embodiments. FIG. 6 includes an example emergency lighting device 602 with a first head 604 and a second head 606.

In some embodiments, the emergency lighting device 602 has two or more LEDs with individual lenses. In some embodiments, the design of each lens may differ from one another. In some embodiments, the light beam of each lens may be aimed at a specific vertical angle and cover a certain zone on the path of egress. The example environment 600 presents an emergency lighting device 602 with two heads and individual lenses. The first head 604 is rotated in a different direction from the second head 606.

Figure 7:
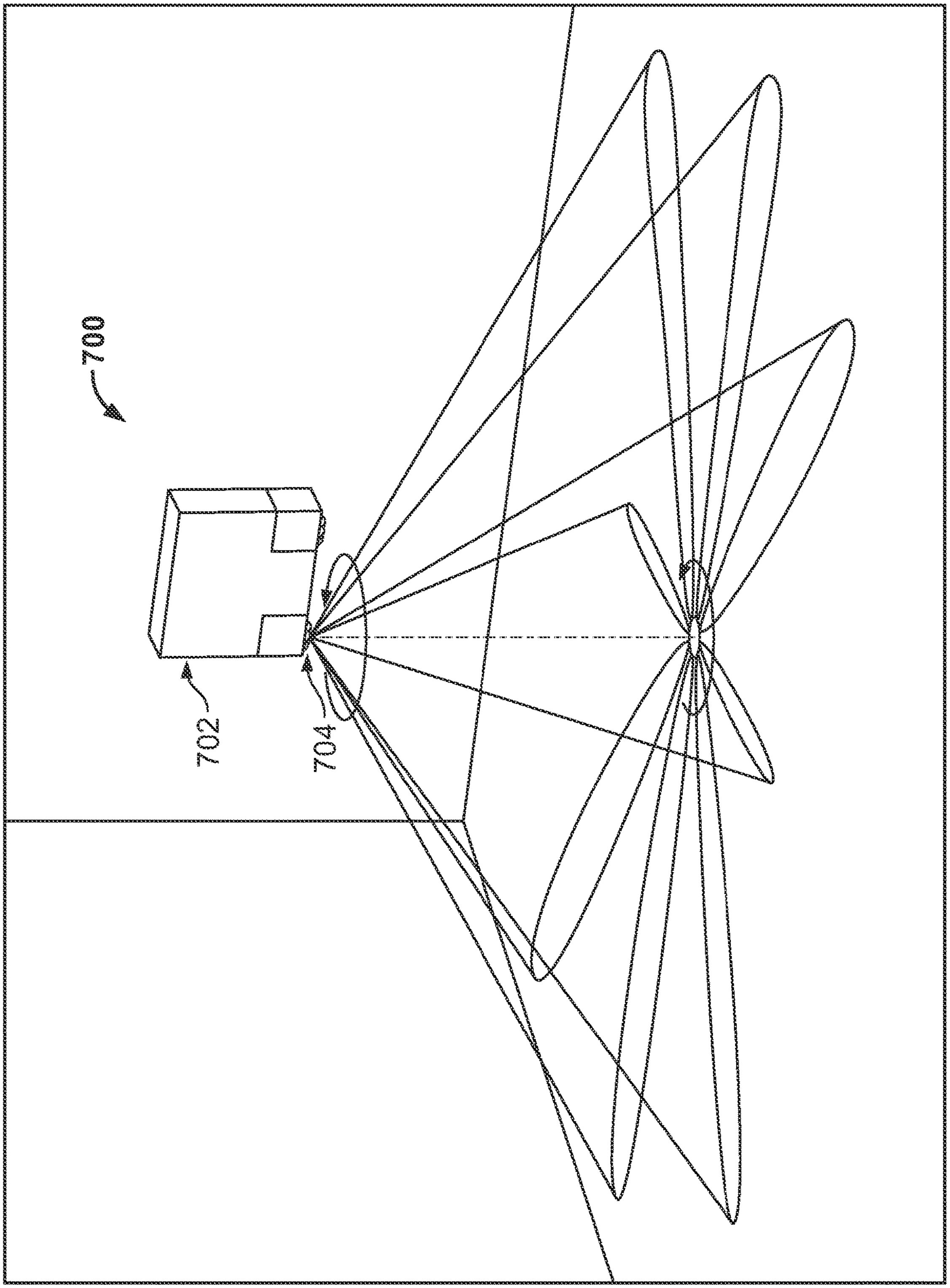
FIG. 7 shows another example environment for and an example emergency lighting device, wherein several different options of lighting coverages which can be implemented by the emergency lighting device according to some embodiments.

FIG. 7 shows another example environment 700 for showing the rotation of emergency heads for lighting coverages implemented by the emergency lighting device of FIG. 2, according to some embodiments. FIG. 7 includes an example emergency lighting device 702 with a rotating head 704.

In some embodiments, the emergency lighting device 702 has two or more LEDs with individual lenses. In some embodiments, the design of each lens may differ from one another. In some embodiments, the light beam of each lens may be aimed at a specific vertical angle and cover a certain zone on the path of egress. The example environment 700 presents an emergency lighting device 702 with two heads and individual lenses. The rotating head 704 showcases the light beam illuminating in various directions on the floor of the environment 700.

Figure 8:
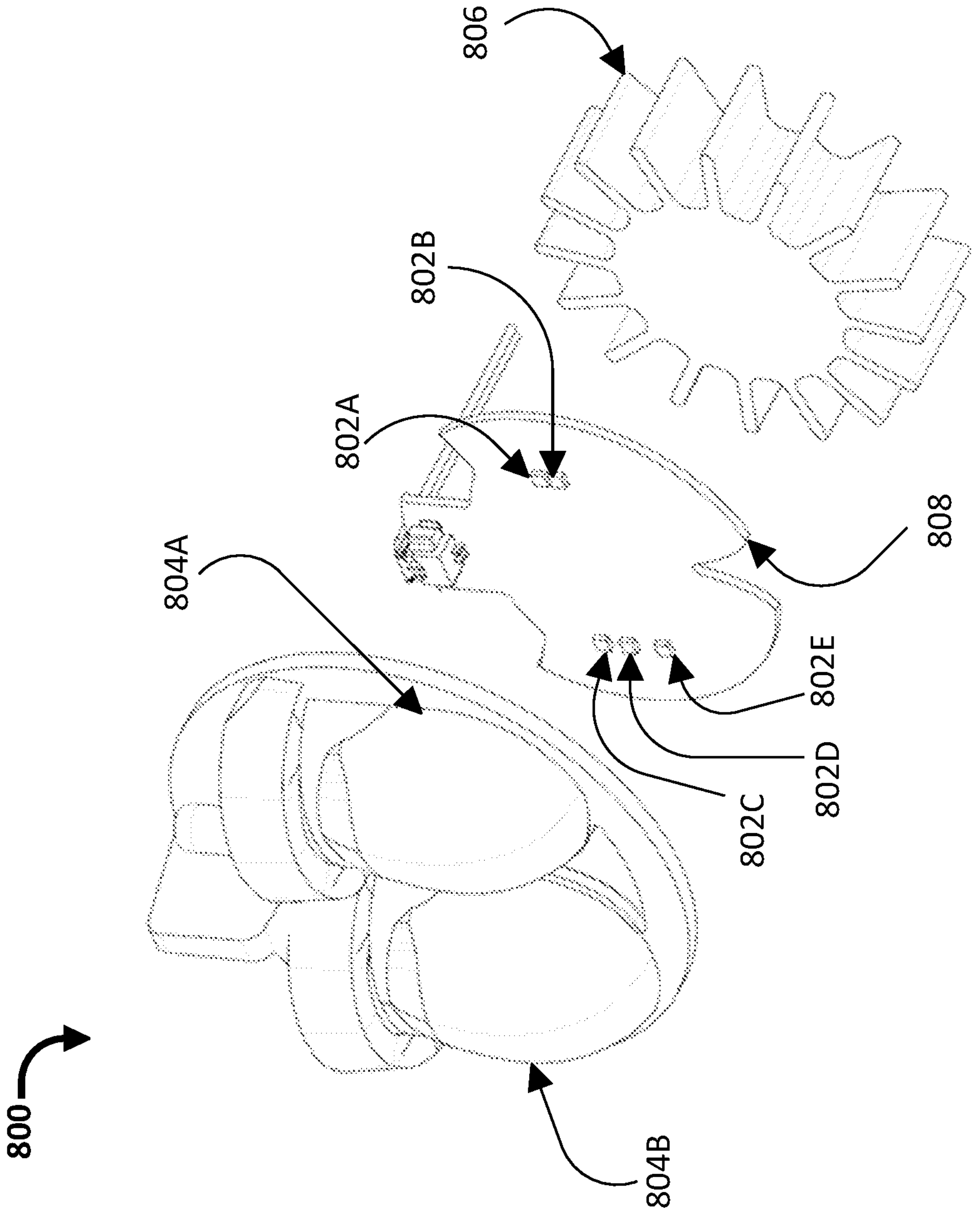
FIG. 8 shows an exploded view of an example lighting assembly, according to some embodiments.

FIG. 8 shows an exploded view of an emergency lighting device 800 according to some embodiments. The emergency lighting device 800 includes light sources 802A, 802B, 802C, 802D, 802E, optics 804A, 804B, and a heat dissipator 806.

In some embodiments, the light sources include one set of LEDs (i.e., two LEDs 802A, 802B) installed on a printed circuit board 808. Another set of LEDs (i.e., three LEDs 802C, 802D, 802E) are also installed on the printed circuit board 808. The first set of LEDs 802A, 802B is configured to fit and function with the first optic 804A. the second set of LEDs 802C, 802D, 802E is configured to fit and function with the second optic 804B. In some embodiments, the heat dissipator 806 may be called a heat sink. In some embodiments, the optics 804A, 804B are lenses. The components are configured to be mounted to horizontal plane and be rotatable with a cylindrical body.

The emergency lighting device 800 provides optimal illumination levels on the path of egress without needing to adjust the vertical aiming (e.g., the tilt). Conventional emergency lighting devices require adjusting the light beam horizontally (e.g., the rotation) and vertically (e.g., the tilt). Because adjustment is manual, inappropriate tilt adjustment at product installation may occur and ultimately reduce the illuminance levels on the floor below the requirements of relevant safety codes and standards.

The lighting assembly does not require tilt orientation. The lighting assembly is cylindrical and needs to be rotated only about the vertical axis. Such is possible by optics 804A, 804B with an asymmetrical light beam, unlike traditional emergency lights that use symmetrical beams to be aimed both by rotation and tilt. The lighting assembly enables the light beam to be aimed easier and faster and guarantees code compliance of illuminance levels for a given range of mounting heights.

Figure 9:
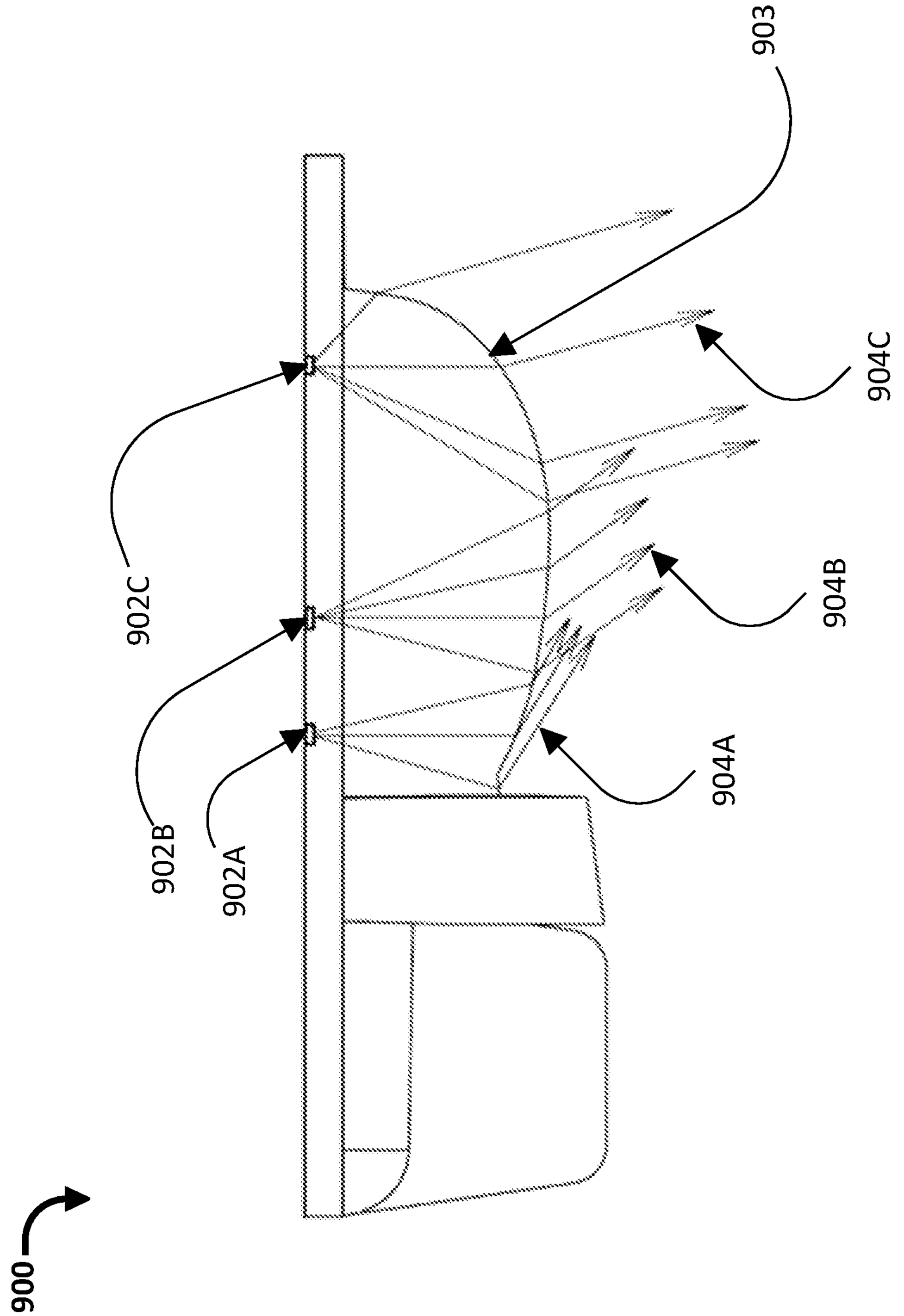
FIG. 9 shows a schematic side view of multiple LEDs and paths of respective lights emitted from the LEDs, which are directed via a lens towards the environment.

FIG. 9 shows a schematic side view of a portion of a lighting assembly 900, wherein three LEDs 902A, 902B, 902C are positioned such that light emitted from the LEDs 902A, 902B, 902C are directed (e.g., refracted) at different directions by a lens 903. The light beam pathways 904A, 904B, 904C emitted from the LEDs 902A, 902B, 902C are shown in FIG. 9, wherein the light beam pathway 904A is directed in a direction that is not parallel to the light beam pathway 904B and/or 904C. Further, the light beam pathway 904B is directed in a direction that is not parallel to the light beam pathway 904A and/or 904C. Further, the light beam pathway 904C is directed in a direction that is not parallel to the light beam pathway 904A and/or 904B. These combine to provide a lighting of an environment which has a unique shape and/or form. The shape of the lens 903 is configured to refract the light beams in this manner, and the shape of the lens 903 and the positions of the LEDs respective to the shape of the lens 903 can be important to achieve these properties. For example, the light emitted from the LEDs 902A, 902B, 902C can be concentrated by the lens 903 to emit an asymmetric narrow light beam. The positioning of the LEDs 902A, 902B, 902C relative to the shape of the lens 903, the light beam can be projected at different angles and/or shapes relative to a vertical axis.

Although various embodiments are described herein, those of ordinary skill in the art will understand that many modifications may be made thereto within the scope of the present disclosure. Accordingly, it is not intended that the scope of the disclosure in any way be limited by the examples provided.

Aspects:

It is to be appreciated that any one or more of the following aspects can be combined with any of aspects.

Aspect 1. An emergency lighting device comprising: a housing container, wherein the housing container includes: a body defining a cavity, and a structural assembly, wherein the structural assembly is configured to be adjustably rotatable along a first translatable axis and independently rotatable along a second translatable axis extending transversely to the first translatable axis; a lighting assembly, wherein the lighting assembly includes: at least one light source, wherein the at least one light source is mounted to the lighting assembly mounted in the structural assembly, and the at least one light source is configured to illuminate an asymmetrical beam of light; and an electrical circuit, wherein the electrical circuit is disposed in the cavity of the housing container, and the electrical circuit is configured to electrically power to illuminate the at least one light source.

Aspect 2. The emergency lighting device of aspect 1, further comprising: at least one aspherical lens being disposed over the at least one light source.

Aspect 3. The emergency lighting device of aspects 1 and/or 2, wherein the at least one aspherical lens produces an asymmetrical light beam output.

Aspect 4. The emergency lighting device of any of aspects 1-3, wherein an orientation of the asymmetrical light beam output adjusts while a shape of the asymmetric lens beam remains substantially constant when the at least one aspherical lens is rotated.

Aspect 5. The emergency lighting device of any of aspects 1-4, further comprising: at least one aspherical lens being disposed over the at least one light source.

Aspect 6. The emergency lighting device of any of aspects 1-5, wherein the at least one aspherical lens has a shape configured to allow for an elongated illumination on a floor at a predetermined angle.

Aspect 7. The emergency lighting device of any of aspects 1-6, wherein the device is configured to have no vertical orientation to tilt.

Aspect 8. The emergency lighting device of any of aspects 1-7, wherein the device is configured to adjust the asymmetrical beam of light by a horizontal orientation to rotate.

Aspect 9. The emergency lighting device of any of aspects 1-8, wherein the lighting assembly mounted in the structural assembly is rotated about on a vertical axis.

Aspect 10. The emergency lighting device of any of aspects 1-9, wherein the at least one light source is a light-emitting diode (LED).

Aspect 11. The emergency lighting device comprising: a housing container, wherein the housing container includes: a body defining a cavity, and a structural assembly, wherein the structural assembly is configured to be adjustably rotatable along a first translatable axis and independently rotatable along a second translatable axis extending transversely to the first translatable axis, and the structural assembly is configured to be not tilted; a lighting assembly, wherein the lighting assembly includes: a plurality of light sources, wherein the plurality of light sources is mounted to the lighting assembly mounted to the structural assembly, and the plurality of light sources are configured to illuminate an asymmetrical beam of light; and an electrical circuit, wherein the electrical circuit is disposed in the cavity of the housing container, and the electrical circuit is configured to electrically power to illuminate the plurality of light sources.

Aspect 12. An emergency lighting device of aspect 11, wherein the device has at least one pre-defined position for a beam orientation.

Aspect 13. The emergency lighting device of any of aspects 11 and/or 12, wherein the at least one pre-defined position for the beam orientation includes 90 degrees, 180 degrees, 270 degrees, and 360 degrees.

Aspect 14. The emergency lighting device of any of aspects 11-13, wherein the plurality of light sources has at least one independent lens.

Aspect 15. The emergency lighting device of any of aspects 11-14, wherein the plurality of light sources has a plurality of lenses molded into the lighting assembly.

Aspect 16. The emergency lighting device of any of aspects 11-15, wherein the plurality of lenses are of various beam patterns.

Aspect 17. The emergency lighting device of any of aspects 11-16, wherein the lighting assembly is mounted in the structural assembly at a non-horizontal plane at a predetermined angle.

Aspect 18. The emergency lighting device of any of aspects 11-17, further comprising: a power source, the power source including a battery.

Aspect 19. The emergency lighting device of any of aspects 11-18, wherein the device has a fixed orientation.

Aspect 20. The emergency lighting device of any of aspects 10-18, wherein the lighting assembly is recessed into the housing container.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. An emergency lighting device comprising:

a housing container, wherein the housing container includes:

a body defining a cavity, and a structural assembly, wherein the structural assembly is configured to be adjustably rotatable along a first translatable axis;

a lighting assembly, wherein the lighting assembly includes:

at least one light source, wherein the at least one light source is mounted to the lighting assembly mounted to the structural assembly, and the at least one light source is configured to illuminate an asymmetrical beam of light; and an electrical circuit, wherein the electrical circuit is disposed in the cavity of the housing container, and the electrical circuit is configured to electrically power to illuminate the at least one light source;

wherein the emergency lighting device is configured to adjust the asymmetrical beam of light by a horizontal orientation to rotate.

2. The emergency lighting device of claim 1, further comprising:

at least one aspherical lens being disposed over the at least one light source.

3. The emergency lighting device of claim 2, wherein the at least one aspherical lens produces an asymmetrical light beam output.

4. The emergency lighting device of claim 3, wherein an orientation of the asymmetrical light beam output adjusts while a shape of the asymmetrical light beam output remains substantially constant when the at least one aspherical lens is rotated.

5. The emergency lighting device of claim 1, further comprising:

at least one aspherical lens being disposed over the at least one light source.

6. The emergency lighting device of claim 3, wherein the at least one aspherical lens has a shape configured to allow for an elongated illumination on a floor at a predetermined distance.

7. The emergency lighting device of claim 1, wherein the emergency lighting device is configured to have no vertical orientation to tilt.

8. The emergency lighting device of claim 1, wherein the lighting assembly mounted in the structural assembly is rotated about on a vertical axis.

9. The emergency lighting device of claim 1, wherein the at least one light source is a light-emitting diode (LED).

10. An emergency lighting device comprising:

a housing container, wherein the housing container includes:

a body defining a cavity, and a structural assembly, wherein the structural assembly is configured to be adjustably rotatable along a first translatable axis and the structural assembly is configured to be not tilted;

a lighting assembly, wherein the lighting assembly includes:

a plurality of light sources, wherein the plurality of light sources are mounted to the lighting assembly mounted to the structural assembly, and the plurality of light sources are configured to illuminate an asymmetrical beam of light; and an electrical circuit, wherein the electrical circuit is disposed in the cavity of the housing container, and the electrical circuit is configured to electrically power to illuminate the plurality of light sources.

11. The emergency lighting device of claim 10, wherein the emergency lighting device has at least one pre-defined position for a beam orientation.

12. The emergency lighting device of claim 11, wherein the at least one pre-defined position for the beam orientation includes 90 degrees, 180 degrees, 270 degrees, and 360 degrees.

13. The emergency lighting device of claim 10, wherein the plurality of light sources has at least one independent lens.

14. The emergency lighting device of claim 10, wherein the plurality of light sources has a plurality of lenses molded into the lighting assembly.

15. The emergency lighting device of claim 14, wherein the plurality of lenses are of various beam patterns.

16. The emergency lighting device of claim 10, wherein the lighting assembly is mounted in the structural assembly at a non-horizontal plane at a predetermined angle.

17. The emergency lighting device of claim 10, further comprising:

a power source, the power source including a battery.

18. The emergency lighting device of claim 10, wherein the emergency lighting device has a fixed orientation.

19. The emergency lighting device of claim 10, wherein the lighting assembly is recessed into the housing container.

* * * * *